3,398,027
PYROMETRIC PROBE
André Lajarrige, Le Creusot, and Jacques Léger, Saint-Julien-sur-Dheune, France, assignors to Societe des Forges et Ateliers du Creusot, Paris, France, a company of France
Filed Nov. 22, 1965, Ser. No. 508,982
Claims priority, application France, Nov. 23, 1964, 995,960
5 Claims. (Cl. 136—234)

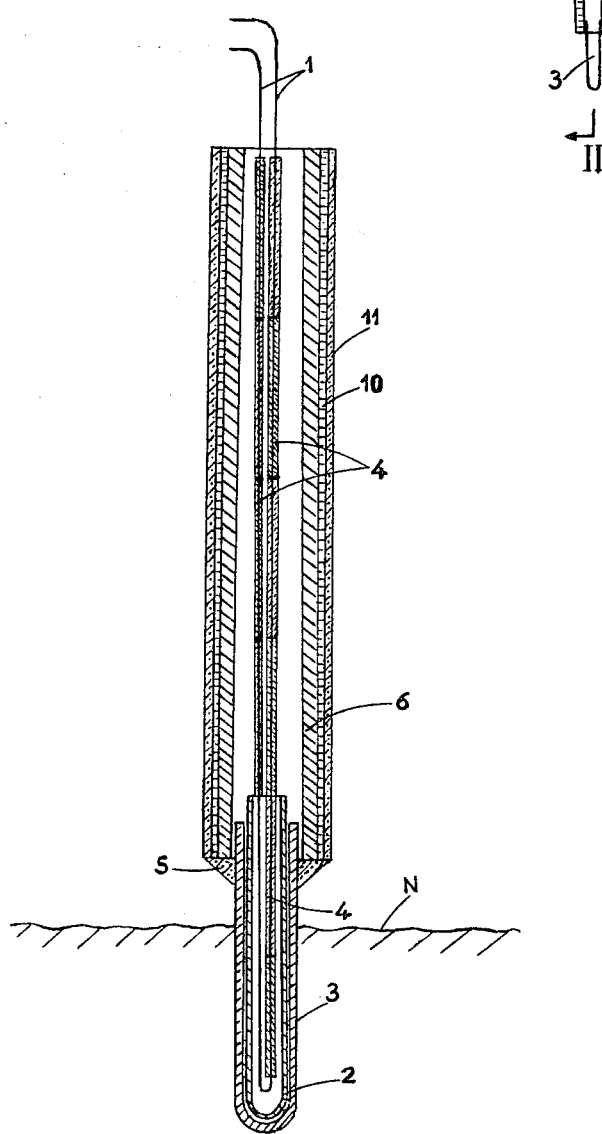

The present invention relates to a pyrometric probe for continuously measuring the temperatures of a melt during the metallurgical workings thereof in the melting furnace.

The quality of a melt prepared in a hot blast melting furnace depends in large part on the variations of the temperature of the melt at the discharge of the furnace.

The pyrometric probe of the present invention provides a continuous measurement of the temperatures of the melt during the entire working thereof in the melting furnace. The measurement of the temperatures is obtained by a thermocouple submerged in the path of flow of the melt.

In accordance with the present invention, the immersed portion of the probe comprises a thermocouple located within a vertical tube made of sillimanite (fibrolite; aluminum silicate) which tube is closed at its lower end and is loosely mounted within a protective sheath made of quartz which protective sheath is sealed to a coaxial steel support tube above the level of immersion in the melt and the support tube is protected by a layer of asbestos.

The accompanying drawings, in which like reference characters indicate like parts, show a preferred embodiment of the present invention more or less schematically. This embodiment of the present invention is described hereinafter to illustrate same and should in no way be construed as defining or limiting of the invention.

In the accompanying drawings,

FIG. 1 is a schematic assembly of a preferred embodiment of the pyrometric probe of the present invention; and FIG. 2 is an enlarged detail of a portion of the embodiment of FIG. 1 on the line II—II thereof showing the protection of the thermocouple and its support.

As is seen in FIG. 2, the two wires 1 of the thermocouple are connected as by soldering adjacent the rounded bottom of a tubular element 2 made of sillimanite. Tubular element 2 is centered in a protective sheath 3 made of quartz.

Tubes 4 of fritted aluminum insulate wires 1 within and above tubular element 2. Wires 1 can slide in tubes 4.

Protective sheath 3 is connected by a joint or seal 5 made of refractory earth to a coaxial vertical tube 6 of steel which in turn is secured at its upper end to a T-shaped coupling 7. Coupling 7 is mounted at the end of a horizontal support tube 8 also made of steel. The other end of support tube 8 is fixed to a base 9 which may include mounting means for the entire structure and which can enclose the ends of the two wires 1 of the thermocouple and the connectors therefor which are not shown. The two wires of the thermocouple can slide within support tube 8 in insulating sheaths which are not shown and which can be made of braided glass.

The assembly comprising the support tube 6, the coupling 7 and the adjacent extremity of support tube 8 is surrounded by a layer 10 of asbestos which may be made up of spiral windings thereof. A covering 11 is mounted on layer 10 and may be a layer of refractory earth to prevent destruction of the layer of asbestos.

The opening in coupling 7 opposite support tube 8 is normally closed by a plug 12 which can be removed to provide access to the interior of the probe for inspection or repair.

The probe is immersed in the melt so that the lower end of the support tube 6 remains at a predetermined distance above the level N of the liquid melt.

The probe of the present invention may be immersed in a receptacle disposed between the exit of the melt from the casting gutter, which may be provided with automatic means for retaining the flux in the mixing ladle or may be located in the metal drain of the furnace. When the probe is located in the metal drain it is protected from direct contact with the flux leaving the furnace by a refractory collar floating on the melt.

The thermocouple described above can be connected to a galvanometer or to an electronic registering potentiometer which, if equipped with a change-over switch, can record the temperatures of the melt in the ladle before pouring and the temperatures at a second probe at the exit from the furnace in the drain of the ladle.

Changes to the above-described illustrative embodiment of the present invention may now be suggested without departing from the present inventive concept and reference should therefore be had to the appended claims to determine the scope of this invention.

What we claim is:

1. A pyrometric probe for continuously measuring the temperature of a liquid melt during processing in a melting furnace, comprising a vertical tube of sillimanite closed at its lower end, a thermocouple mounted within said tube, wires leading from said thermocouple, a quartz protective sheath surrounding said tube and immersed in the liquid melt, a steel support tube connected to and coaxial with said sheath above the level of immersion of said sheath in the melt and a protective layer of asbestos on said support tube.

2. A pyrometric probe as described in claim 1 including a refractory seal between said sheath and said support tube.

3. A pyrometric probe as described in claim 1 including a layer of refractory earth on said layer of asbestos.

4. A pyrometric probe as described in claim 1 including a horizontal support tube, said steel support tube being mounted at one end of said horizontal support tube and a base connected to the other end of said horizontal support tube enclosing said wires from said thermocouple.

5. A pyrometric probe as described in claim 1 including woven glass insulating sheaths for said wires within said horizontal support tube and fritted aluminum insulating tubes for said wires within said steel support tube.

References Cited

UNITED STATES PATENTS

| | | | |
|---|---|---|---|
| 2,343,242 | 3/1944 | Richmond | 136—242 |
| 2,405,075 | 7/1946 | Vollrath | 136—242 |
| 2,802,894 | 8/1957 | Schneider et al. | 136—232 |
| 3,278,341 | 10/1966 | Gee | 136—234 X |

ALLEN B. CURTIS, *Primary Examiner.*